US010735362B2

(12) United States Patent
Crowther et al.

(10) Patent No.: US 10,735,362 B2
(45) Date of Patent: Aug. 4, 2020

(54) PUBLISH/SUBSCRIBE MESSAGING USING MESSAGE STRUCTURE

(71) Applicant: INTERNATIONAL BUSINESS MACHINES CORPORATION, Armonk, NY (US)

(72) Inventors: Fiona M. Crowther, Manchester (GB); Geza Geleji, Hursley (GB); Christopher J. Poole, Hursley (GB); Martin A. Ross, Hursley (GB); Craig H. Stirling, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/941,844

(22) Filed: Nov. 16, 2015

(65) Prior Publication Data

US 2016/0149846 A1 May 26, 2016

(30) Foreign Application Priority Data

Nov. 21, 2014 (GB) .................................. 1420708.8

(51) Int. Cl.
*H04L 12/58* (2006.01)
(52) U.S. Cl.
CPC ............ *H04L 51/14* (2013.01); *H04L 51/046* (2013.01); *H04L 51/28* (2013.01)
(58) Field of Classification Search
CPC ................. H04L 43/06; H04L 67/2842; G06F 17/30286
USPC ........................................................ 709/206
See application file for complete search history.

(56) References Cited

U.S. PATENT DOCUMENTS

| 7,970,823 | B2  | 6/2011 | Moeller et al. |
| 7,970,918 | B2  | 6/2011 | Thompson et al. |
| 8,140,630 | B2* | 3/2012 | Jones ............... G06F 9/526 709/202 |

(Continued)

FOREIGN PATENT DOCUMENTS

| CA | 2788942 A1 | 3/2013 |
| EP | 1130845 A2 | 9/2001 |
| GB | 2411312 A | 8/2005 |

OTHER PUBLICATIONS

Cao, Yang et al., "Caching Techniques for SML Message Filtering," IEEE 28th International Performance Computing and Communications Conference, Dec. 2009, pp. 315-322.

(Continued)

*Primary Examiner* — Jerry B Dennison
(74) *Attorney, Agent, or Firm* — Heslin Rothenberg Farley & Mesiti P.C.; Steven Chiu, Esq.

(57) ABSTRACT

Publish/subscribe messaging using a message structure carried out at a messaging intermediary system is provided. A plurality of lists to which publishing entities can publish messages and to which subscribing entities can subscribe to messages is maintained. A list for messages conforming, at least partly, to a common message structure is provided. A request from a publishing entity or a subscribing entity is matched to one or more provided lists by comparing a message having a message structure or an abstract representation of one or more messages to the provided lists. Messages conforming, at least partly, to the common message structure via the list are shared.

19 Claims, 8 Drawing Sheets

(56) References Cited

U.S. PATENT DOCUMENTS

| | | | |
|---|---|---|---|
| 8,606,233 B2 | 12/2013 | Brown et al. | |
| 10,270,726 B2* | 4/2019 | Sedan | H04L 51/14 |
| 10,298,661 B2* | 5/2019 | Harries | H04L 67/10 |
| 10,382,574 B2* | 8/2019 | Milyakov | H04L 47/722 |
| 2003/0115336 A1* | 6/2003 | Auerbach | G06Q 30/02 |
| | | | 709/228 |
| 2005/0021622 A1* | 1/2005 | Cullen | G06Q 30/02 |
| | | | 709/204 |
| 2006/0230062 A1* | 10/2006 | Roy-Chowdhury | |
| | | | G06Q 30/0613 |
| 2007/0255711 A1* | 11/2007 | Zhou | G06F 17/30864 |
| 2008/0059651 A1 | 3/2008 | Ashwood Smith | |
| 2009/0182825 A1* | 7/2009 | Fletcher | G06Q 10/00 |
| | | | 709/206 |
| 2009/0228563 A1 | 9/2009 | Jones et al. | |
| 2009/0287805 A1* | 11/2009 | Hawkins | H04L 51/00 |
| | | | 709/223 |
| 2010/0256994 A1* | 10/2010 | Eisenberger | G06Q 10/10 |
| | | | 705/3 |
| 2010/0281154 A1* | 11/2010 | Bedi | G06F 11/2294 |
| | | | 709/224 |
| 2011/0307603 A1* | 12/2011 | Ishikawa | H04L 67/26 |
| | | | 709/224 |
| 2014/0082639 A1 | 3/2014 | Marappan | |
| 2016/0112438 A1* | 4/2016 | Hengstler | H04L 51/12 |
| | | | 726/4 |
| 2016/0330209 A1* | 11/2016 | Iacob | H04L 63/0428 |

OTHER PUBLICATIONS

Search Report under Section 17(5) for GB1420708.8 dated May 27, 2015, pp. 1-4.
Diao, Yanlei et al., "XML Publish/Subscribe," (no date infolination available), pp. 1-6.
Lublinsky, Boris, "Implementing Pub/Sub Based on AWS Technologies," downloaded from internet Nov. 10, 2015, pp. 1-28.

* cited by examiner

PUBLISH/SUBSCRIBE MESSAGING USING MESSAGE STRUCTURE

PRIOR FOREIGN APPLICATION

This application claims priority from United Kingdom patent application number 1420708.8, filed Nov. 21, 2014, which is hereby incorporated herein by reference in its entirety.

BACKGROUND

One or more aspects relate to the field of publish/subscribe messaging. In particular, one or more aspects relate to publish/subscribe messaging using a message structure.

There are many situations in which the user of a computer system may want one application or system to share certain information with another application or system. For example, it would be useful if, when composing a new email in a client such as Notes (Notes is a trademark of International Business Machines Corporation), the client could collect email addresses seen on screens in other applications; for example, a colleague may have just sent the address of someone in Sametime (Sametime is a trademark of International Business Machines Corporation). Currently, the user has to copy and paste this address from Sametime to Notes.

For a simple case of one-to-one linking between two applications, or even many-to-one linking, this can be accomplished easily using inter-process communication, or having the receiving application expose an application programming interface (API) of some kind, such that it can listen for input of a certain pre-defined form. However, this system becomes unmanageable when there are many-to-many links, and when there is no precise pre-agreed standard for the form of information required. For example, there are many regular expressions in use to validate email addresses.

To solve this problem, as well as potentially others, publish/subscribe and queue-based messaging systems may be used. Publish/subscribe messaging systems are very popular, but one requirement is that the topic name is known in order to publish and subscribe to messages.

Two applications may communicate by publishing and then subscribing to an agreed topic, but this would require the developers of the two applications to agree on a topic name. Often, naming schemes and conventions are agreed upon in standards, but occasionally one may desire to publish or subscribe to ad-hoc topics.

SUMMARY

Shortcomings of the prior art are overcome and additional advantages are provided through the provision of a method of publish/subscribe messaging. The method includes, for instance, maintaining a plurality of lists to which publishing entities can publish messages and to which subscribing entities can subscribe to messages; providing a list for messages conforming, at least in part, to a common message structure; matching a request from one of a publishing entity or a subscribing entity to one or more provided lists by comparing one of a message having a message structure or an abstract representation of one or more messages to the one or more provided lists; and sharing messages conforming, at least in part, to the common message structure via the list for messages conforming.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
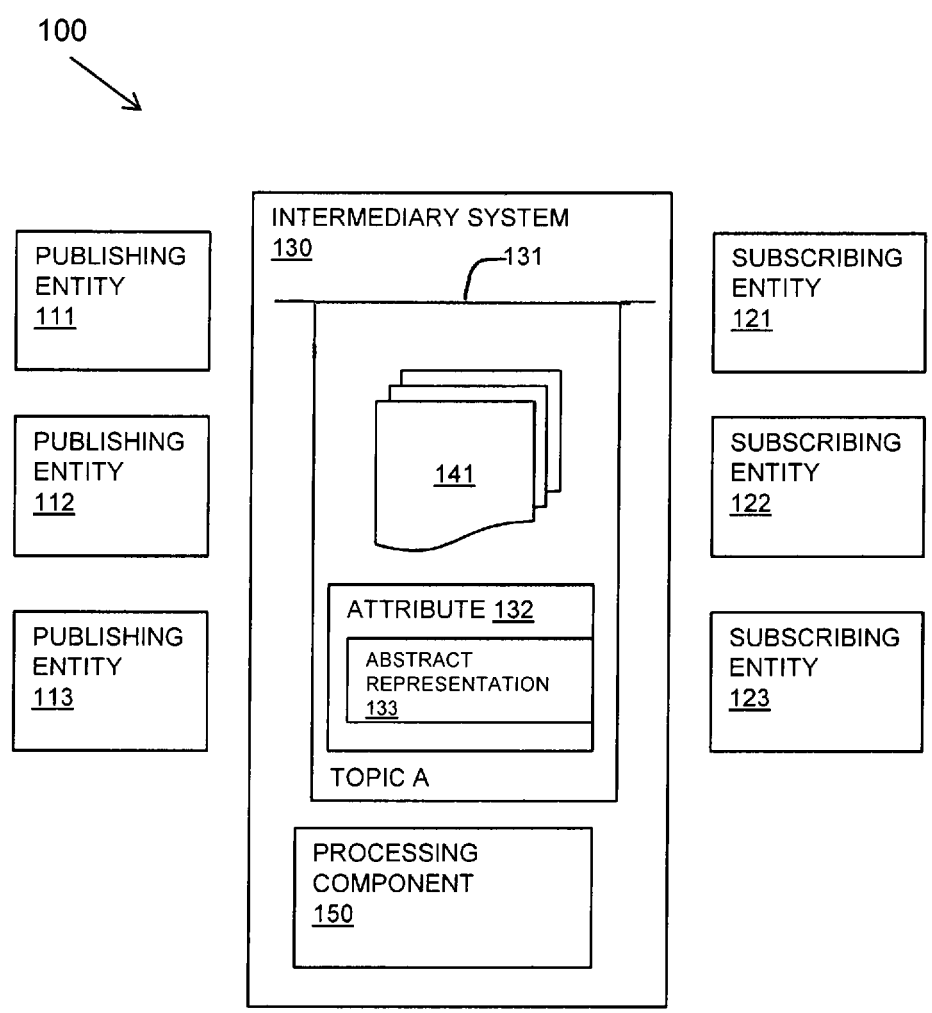
FIG. 1 is a schematic diagram of an example embodiment of a system in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of aspects of the invention. However, it will be understood by those skilled in the art that one or more aspects of the present invention may be practiced without these specific details. In other instances, well-known methods, procedures, and components have not been described in detail so as not to obscure aspects of the present invention.

Aspects of the described method and system allow for applications or systems to share information, by only knowing the structure of the data, and not a topic name for the data. For two applications or systems, it is relatively easy for a naming scheme to be agreed upon. However, for many applications all sharing a same data type, it is hard to all agree upon a name up front. Therefore, the concept becomes increasingly powerful as more systems subscribe or publish to a topic based on the data type or structure.

Aspects of the described method and system provide for the negotiation of a publish/subscribe topic at runtime to use for sharing of information of a particular structure.

An intermediary system between publishing entities and subscribing entities may be provided in the form of a queue manager, messaging middleware system, or other system which may receive items from publishers for distribution to subscribers. The intermediary system maintains lists of the items (such as messages) to which the items are published by publishing entities and obtained by subscription by subscribing entities. For example, the lists may be queues of messages based on common topics of the messages.

In a described publish/subscribe messaging system, the items may be messages formed of data having different structures. In aspects of the described method and system, a list topic is based on the structure of the data in the message resulting in lists including items having a common or overlapping message structure.

In aspects of the described method and system, a list may have a name or identifier (ID), and some additional metadata that is an abstract representation of the data it contains. In one embodiment, this abstract representation could be the name/ID itself, but equally the name/ID could simply be a random hash or number.

The abstract representation defines a structure of data items to be published and subscribed to. The abstract representations may be regular expressions, search patterns, or query language expressions. Many different languages may be used which may describe a yes/no, Boolean response type query. Query languages may include, but are not limited to, XPath, XQuery, SQL and variants thereof, XSLT, etc. The abstract representations may be used to match strings of text, other syntax or data representations, such as XML.

Publishing entities may query the intermediary system to ascertain if it has a list that matches or partially matches a structure of messages. If the answer is positive, then that publishing entity can start publishing messages to that list. If the answer is negative, a new list may be created for that publishing entity to start publishing messages of this structure to. In one embodiment, instead of looking at the metadata of each list to return a matching list, the intermediary system may look through each item in each list to find a list that matches the structure of message that the publishing entity provides.

Subscribing entities may query the intermediary system to ascertain if it has any lists that match or partially match a message structure. The intermediary system may then look through each list's items (i.e., not just the list's metadata), to find lists that have items matching the message structure given by the subscribing entity. The subscribing entity may then subscribe to the lists with matching or partially matching items.

Various embodiments of the described method and system are provided.

In one embodiment, an abstract representation of a data structure is used to define a data structure and to match a publishing or subscribing request to exiting lists. The lists may have an abstract representation of the data structure provided as metadata of the list, for example, as an attribute of the list. In one case, the abstract representation may be provided as a name of a list.

A publishing or subscribing request may define an abstract representation (which may be of a different form to the abstract representation of the metadata or attribute) which is compared to any one or more of: a name of a list, metadata of a list, or messages within the list.

In another embodiment, a publishing or subscribing request may define a message structure by providing a message itself. The message may be compared to an abstract representation of the structure of messages of a list or with messages within the list.

The lists for common data structures of messages may evolve as publishing and subscribing requests are matched including splitting and merging of lists to better cover a form of a data structure.

Referring to FIG. 1, a schematic diagram 100 shows a publish/subscribe architecture formed of multiple publishing entities 111-113 and multiple subscribing entities 121-123 with an intermediary system 130 for managing the publish/subscribe processing. It should be understood that publishing entities may also be subscribing entities and subscribing entities may also be publishing entities and that these types of entities are shown separately for simplicity.

The intermediary system 130 includes at least one topic list 131 in which multiple items or references to items 141 may be provided. The topic list 131 may have attributes 132 including metadata of an abstract representation 133 defining a message structure to which items in the list conform, at least partially.

The intermediary system 130 may also include a processing component 150 for processing publish or subscribe requests and matching to appropriate lists 131 for a given structure of items. In particular, the processing component 150 may match items to abstract representations of the structures of items. Further details of the processing component 150 are given below.

Figure 2A:
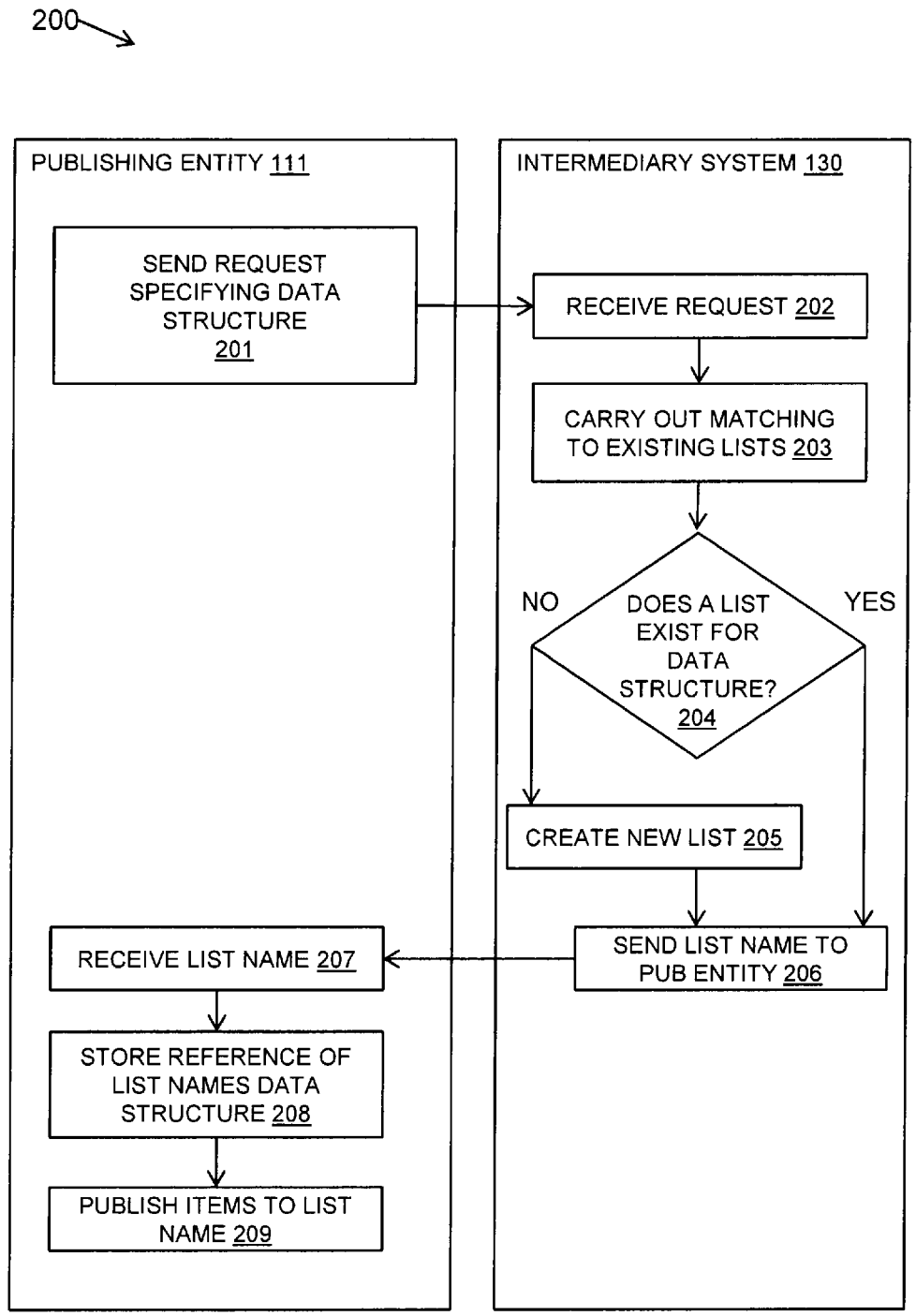
FIG. 2A is a flow diagram of an example embodiment of an aspect of a method in accordance with one or more aspects of the present invention.

Referring to FIG. 2A, a flow diagram 200 shows an example embodiment of a method carried out at a publishing entity 111 and at an intermediary system 130.

The publishing entity 111 sends 201 a request to the intermediary system 130 specifying a structure of messages it wishes to publish. The message structure may be provided as an abstract representation of the message structure, or may be a sample of a message of the message structure form.

The request is received 202 at the intermediary system 130 and a matching search is carried out 203 to match or partially match the request to one or more existing lists for the same or a similar message structure of items. This may be matched by a name of a topic list, metadata relating to the abstract representation of the items in a list, or items themselves in a list.

It is determined 204 whether one or more lists exist for message structures that match or partially match the message structure defined in the request. If it is determined that no list exists, a list may be created 205 at the intermediary system 130.

A sample of a message of the message structure form may be sent 201 by the publishing entity for simple messages which the intermediary system 130 can match 203 to existing lists. However, if there is no matching topic for a sample of a message, the intermediary system 130 may create a list and ask the intended publishing entity 111 for an abstract expression. This may be carried out in an opening handshake between the intermediary system 130 and the publishing entity 111.

If it is determined that one or more lists already exist or a new list has been created 205, then the list name or other identifier may be sent 206 to the publishing entity 111.

The publishing entity 111 may receive 207 the list name. The publishing entity 111 may store 208 a reference of list names for message structures, for example using an abstract representation or a name of the message structure. The publishing entity 111 may subsequently publish 209 items of this message structure to this list as they arise.

Figure 2B:
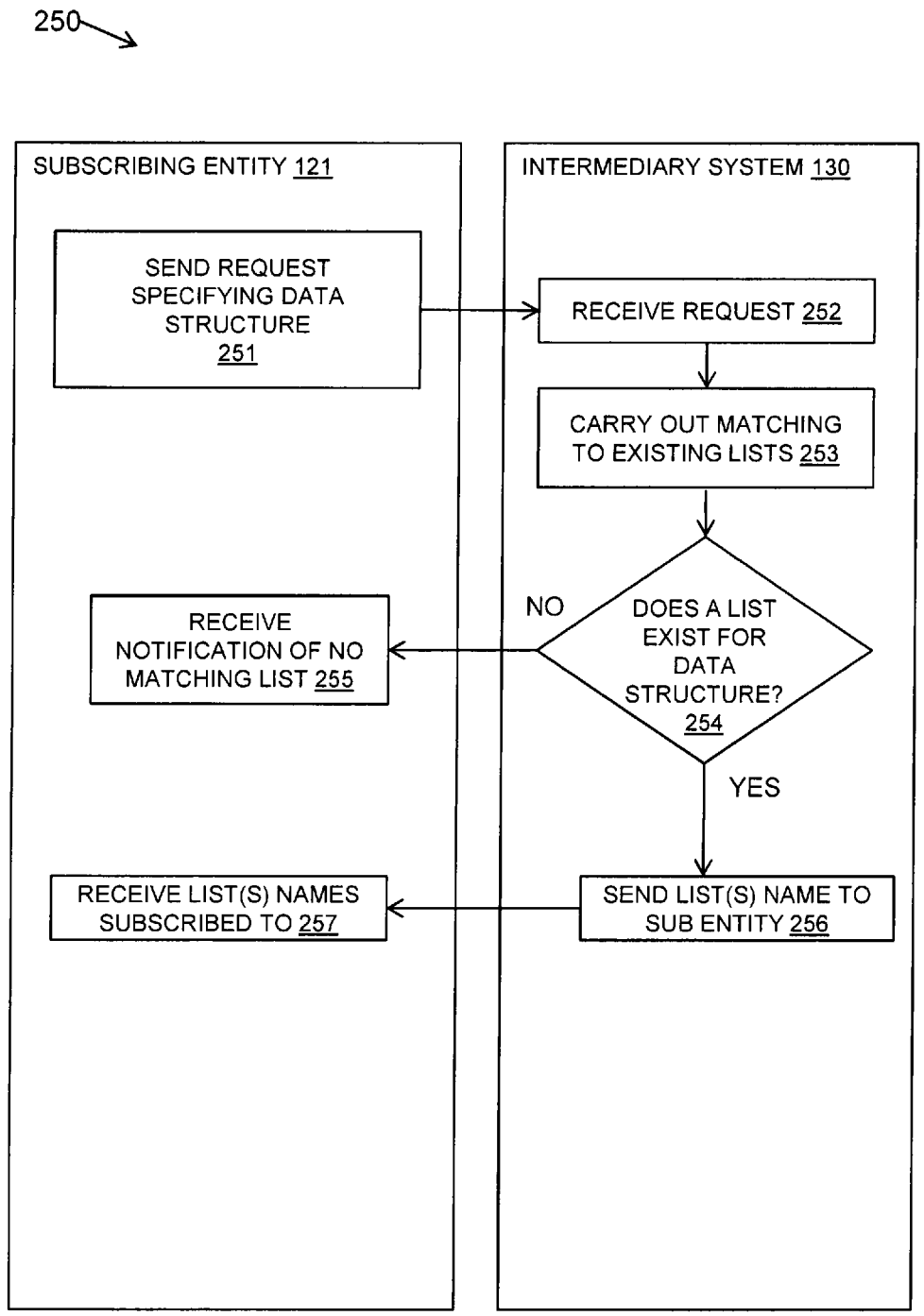
FIG. 2B is a flow diagram of an example embodiment of an aspect of a method in accordance with one or more aspects of the present invention.

Referring to FIG. 2B, a flow diagram 250 shows an example embodiment of a method carried out at a subscribing entity 121 and at an intermediary system 130.

The subscribing entity 121 may send 251 a request to the intermediary system 130 including reference to a message structure, for example, as an abstract representation, a name of the message structure, or a sample item of the form of the message structure. The request may request lists which match or partially match the message structure.

The intermediary system 130 may receive 252 the request and carry out a matching search 253 of the lists at the intermediary system 130 to match or partially match the request to one or more existing lists with the same or a similar message structure of items. This may be matched by a name of a topic list, metadata relating to the abstract representation of the items in a list, or items themselves in a list.

It may be determined 254 if one or more lists exist for message structures that match or partially match the message structure defined in the request.

There are various possible "quality of match" embodiments that may be implemented including the following: look through every item of each list to ensure all items in the list match the expression given by the subscribing entity; look through all items in the list until a match is found; and (for performance), only look at the first item in the list.

If it is determined 254 that no lists substantially match a message structure of a request, a notification may be sent 255 to the subscribing entity informing the subscribing entity of this. If it is determined 254 that there are lists which match the message structure, the list names are sent 256 to the subscribing entity 121.

The subscribing entity 121 may subscribe 257 to one or more of the lists using the list names.

When a new item is published to a list to which the subscribing entity 121 is subscribed, the item is pushed to the subscribing entity 121 by the intermediary system 130. Optionally, when new items are pushed to subscribing entities, the subscribing entity can do its own filtering to ensure correctness.

Figure 3:
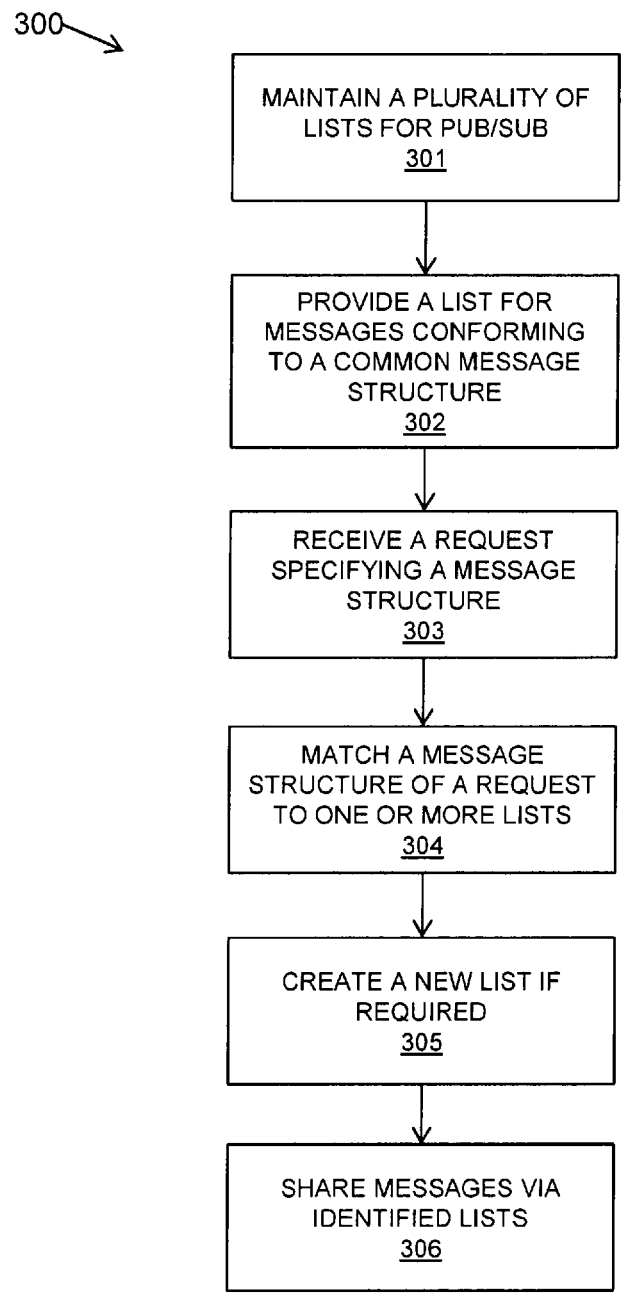
FIG. 3 is a flow diagram of an example embodiment of a method in accordance with one or more aspects of the present invention.

Referring to FIG. 3, a flow diagram 300 shows an example embodiment of the described method as carried out by the intermediary system 130.

The intermediary system 130 may maintain 301 a plurality of lists to which publishing entities can publish messages and to which subscribing entities can subscribe to messages, this may include providing 302 a list for messages conforming, at least partly, to a common message structure. Providing 302 a list may include defining a name or ID for the list and also defining metadata for the list in the form of an abstract representation of the message structure for which the list is provided. The abstract representation may take different forms, for example, a regular expression, a search pattern, a query language expression, such as an XPath expression, etc. The abstract representation may define the structure of the message in terms of patterns, types of data, format, type, etc.

In the example of regular expressions, characters are understood to be metacharacters with a special meaning or regular characters with a literal meaning. Together the characters can be used to identify textual material of a given pattern or structure. In another example of query language expressions, syntax is used to navigate data terms.

A request may be received 303 from a publishing entity or a subscribing entity requesting details of lists to be published to or subscribed to for a message of a message structure specified in the request. The request may include an abstract representation of the message structure, or may include a sample of a message of the form of the message structure, or may include a name of the message structure.

Matching 304 is carried out of the message structure of the request with existing lists for message structures. This matching may be carried out in various ways. In one embodiment, matching the message structure specified in the request may match with individual items in the lists. In another embodiment, matching an abstract representation of a message structure specified in the request may match with an abstract representation of a message structure of a list provided as metadata of the list.

The matching may include partial matching of requests to lists. In one embodiment, the intermediary system 130 may browse list items to obtain a proportion of data that matches in a "partial match". Additionally or alternatively, a filter may be provided for filtering unsuitable data from partial matches.

If a publishing entity's request does not result in matching or partially matching lists, a new list may be created 305 for the message structure of the request.

The intermediary system 130 may provide publishing entities and subscribing entities with names or IDs of lists to which they should publish or subscribe for the requested message structure.

Subscribing entities could be returned a subscription to multiple topics that match the pattern exactly or a subset. This could be done transparently to the subscriber and managed at the intermediary system 130.

Messages may be shared 306 by publishing messages to one or more identified lists for a message structure and subscribing to one or more identified lists.

The lists may evolve by merging and splitting to accommodate message structures as defined in requests by publishing entities and subscribing entities.

If a topic is determined to not reach a defined threshold (i.e., <50% of data matches) a subscription could be removed. Alternatively, the intermediary system could have logic to split a topic appropriately based on statistical analysis of pattern matches.

On publish, "partial matching" could be identified and overlapping patterns with common data could be merged to use the same topic.

Figure 4:
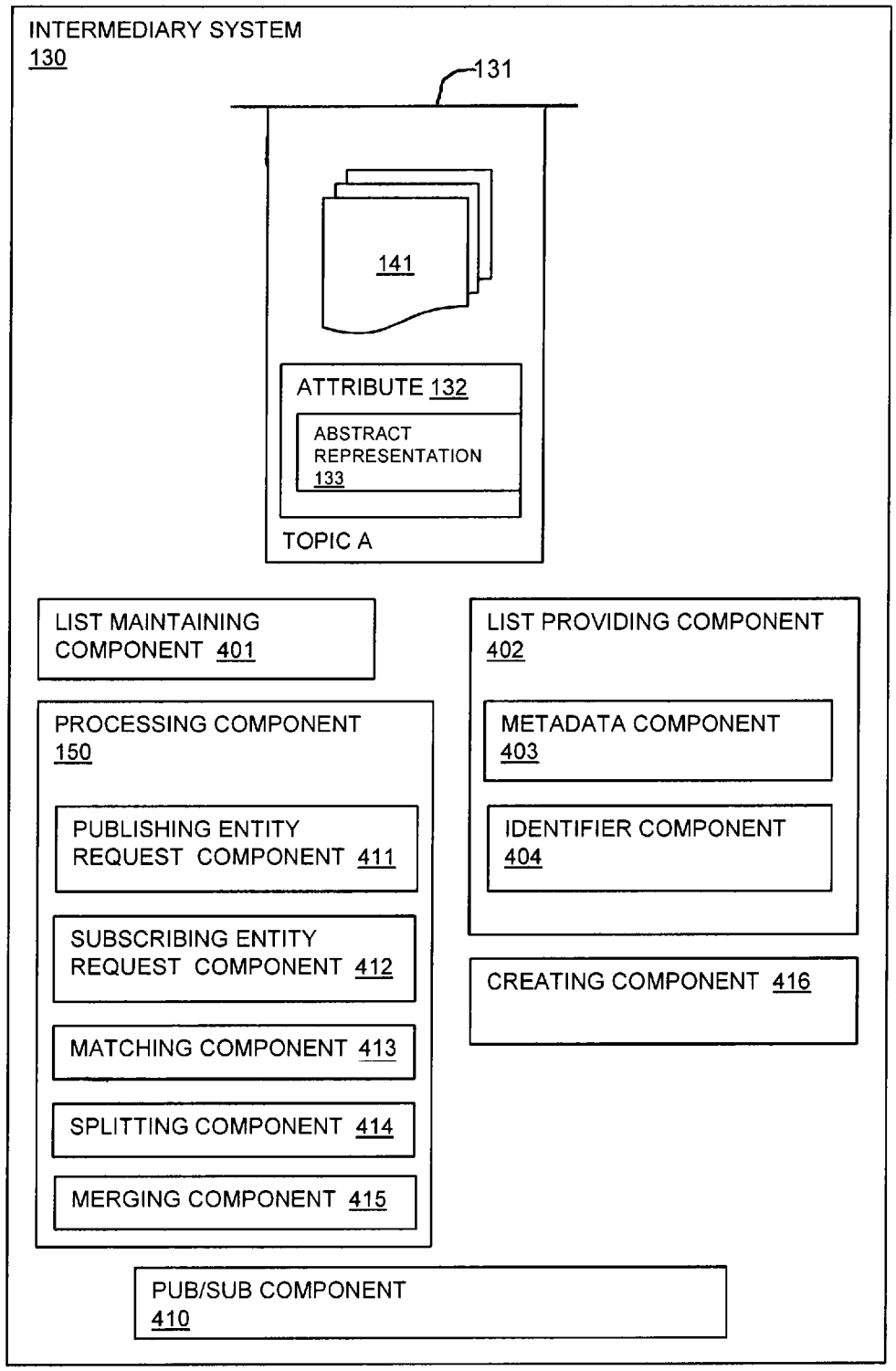
FIG. 4 is block diagram of an example embodiment of a system in accordance with one or more aspects of the present invention.

Referring to FIG. 4, a block diagram shows an example embodiment of an intermediary system 130. The intermediary system 130 as described in FIG. 1 manages publish/subscribe processing between publishing entities and subscribing entities.

The intermediary system 130 includes at least one topic list 131 in which multiple items or references to items 141 may be provided. The topic list 131 may have attributes 132 including metadata of an abstract representation 133 defining a message structure to which items in the list conform, at least partially.

The intermediary system 130 includes a list maintaining component 401 for maintaining a plurality of lists to which publishing entities can publish messages and to which subscribing entities can subscribe to messages. A list providing component 402 provides a list of messages conforming, at least partly, to a common message structure. The list providing component 402 may include an identifier component 404 for providing a name or identifier for a list and a metadata component 403 for providing metadata for a list of an abstract representation of the common message structure.

The intermediary component 130 may include a processing component 150 for matching a request from a publishing entity or a subscribing entity to one or more provided lists. The processing component 150 may include a matching component 413 for comparing and matching a message having a message structure or an abstract representation of one or more messages to the provided lists.

The processing component 150 includes a publishing entity request component 411 for processing requests from a publishing entity. The processing component 150 may also include a subscribing entity request component 412 for processing requests from a subscribing entity.

The processing component 150 may also include a splitting component 414 and a merging component 415 for evolving the lists based on messages structures of requests from the publishing entities and subscribing entities.

A publish/subscribe component 410 shares messages conforming, at least partly, to the common message structure via the lists.

Figure 5:
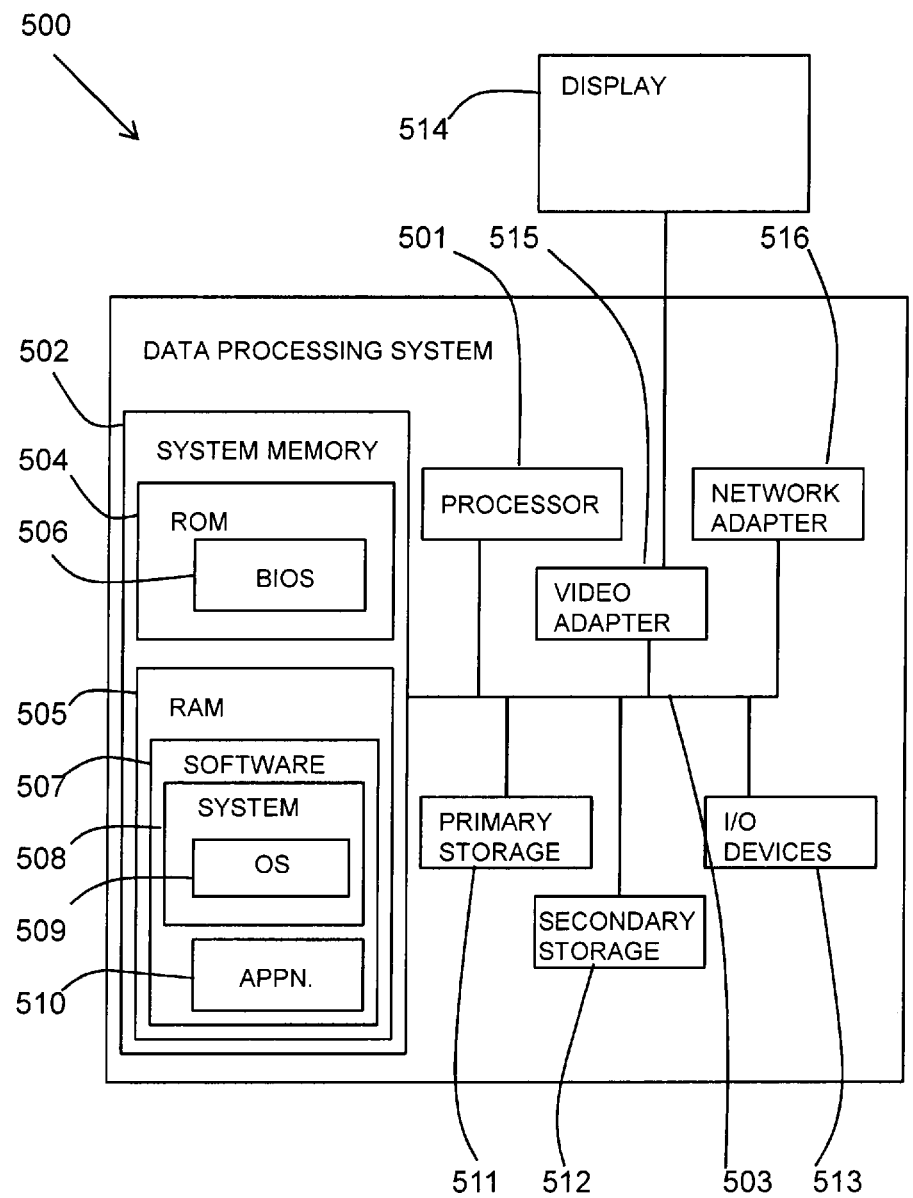
FIG. 5 is a block diagram of an embodiment of a computer system in which one or more aspects of the present invention may be implemented.

Referring to FIG. 5, an example system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code is to be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508, such as operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512, as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Figure 6A:
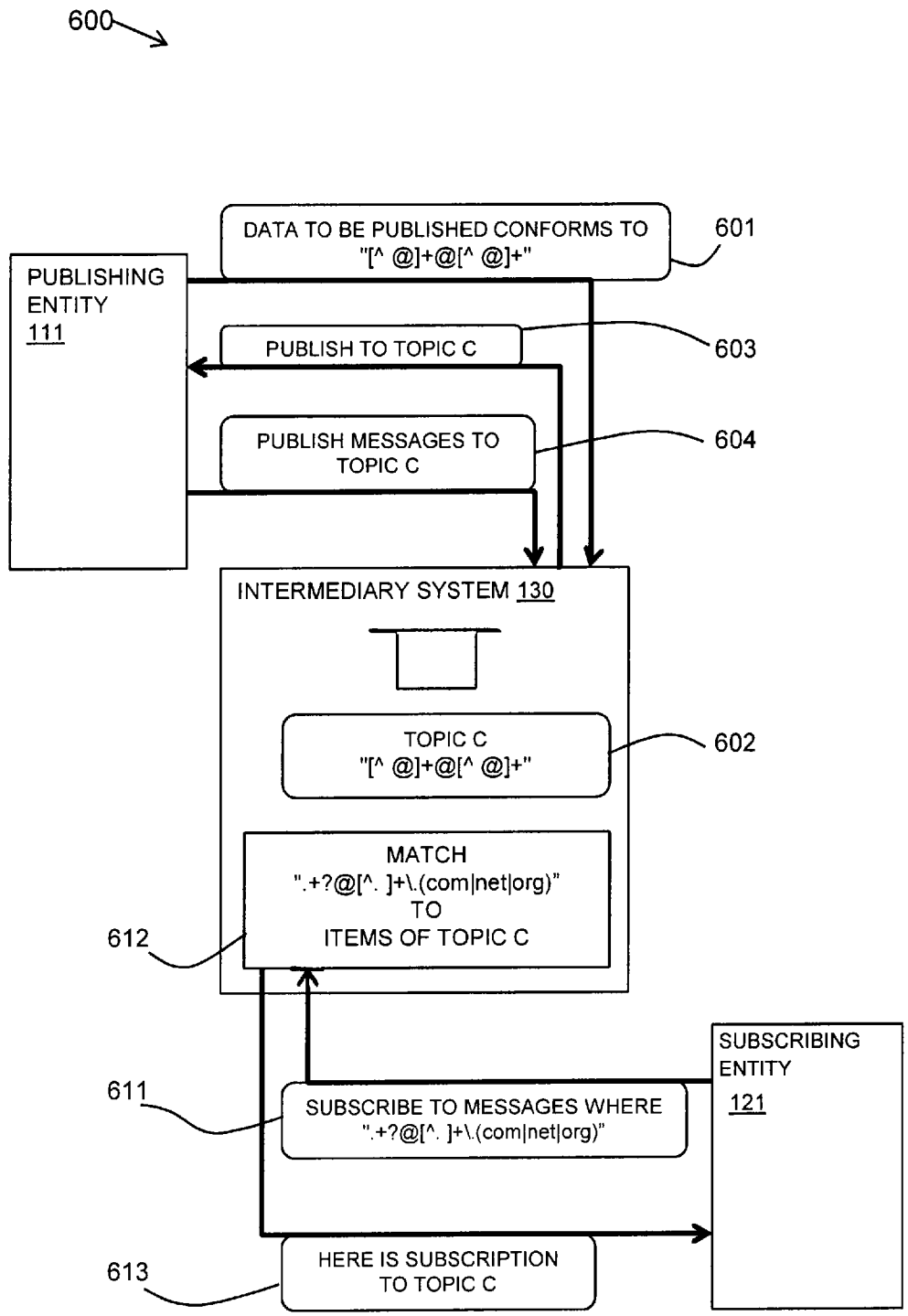
FIGS. 6A and 6B are schematic diagrams illustrating example embodiments of aspects of the present invention.

Referring to FIG. 6A, schematic diagram 600 shows one example embodiment of aspects of the described method in which a message structure is defined by an abstract expression in the form of a regular expression of an email address.

A publishing entity 111 requests 601 to publish messages having a message structure defined by a regular expression for email addresses of the form "[^@]+@[^ @]+".

An intermediary system 130 may define 602 a list "Topic C" with metadata of the regular expression provided by the publishing entity 111 of "[^@]+@[^ @]+". The intermediary system 130 may return 603 a name/ID of the list "Topic C" to publish those messages to.

For example, if an application, such as a Sametime application, is wanting to publish email addresses that it can read in its windows, it may want to publish to a list of this form that would match email addresses. If a list already exists (perhaps another instance of Sametime has been running), the list name will be returned, but otherwise, the list will be created and its ID will be returned to the Sametime application.

The publishing entity 111 may then publish 604 its messages of this message structure to the identified list, "Topic C".

A subscribing entity 121, such as a Notes application, may want to pull in email addresses from other applications in the system.

The subscribing entity 121 asks 611 the intermediary system 130 if it has any lists with items matching a regular expression ".+?@[^.]+\.(com|net|org)", which a Notes developer has written to match email addresses. It should be noted that this is different to the above regular expression used in the publishing entity's request.

The intermediary system 130 matches 612 by comparing to lists it owns, and finds the list for "Topic C" 602 that the publishing entity 111 is publishing email addresses to. At least one item in this list matches the expression that the subscribing entity's developer has provided.

The intermediary system 130 confirms 613 that there is a list with matching items, and it subscribes the subscribing entity 121 to that list.

Some time later, the publishing entity (e.g., Sametime application) publishes an email to the list for "Topic C", and thus, it is pushed to the subscribing entity (e.g., Notes application) by the intermediary system. The subscribing entity can now use this email address information as it wants, for example, by pushing it onto its internal stack of addresses that is used when a user starts typing an email address in a "TO" field when composing an email. Optionally, the subscribing entity could perform extra filtering checks at this point to ensure consistency.

Figure 6B:
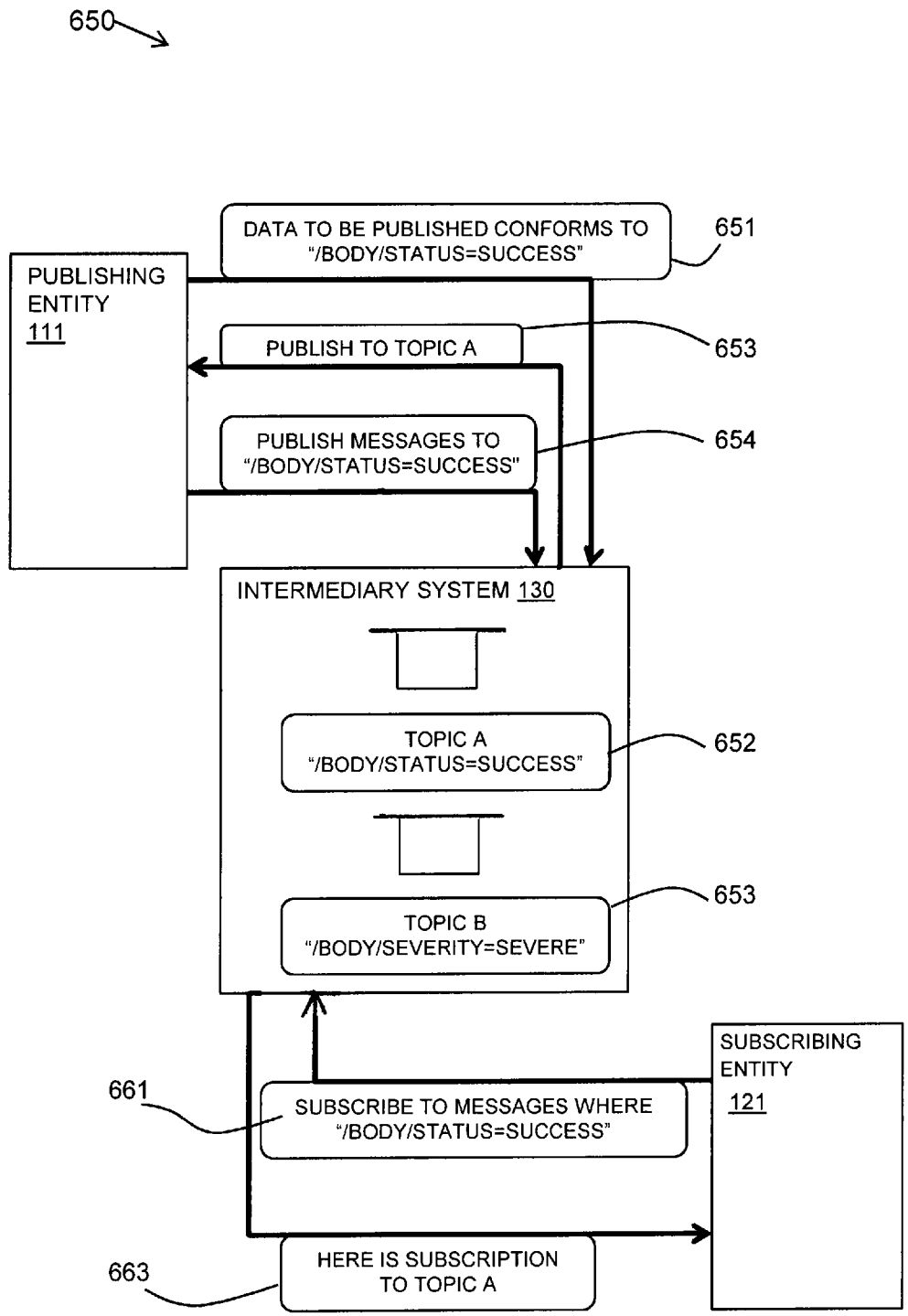

Referring to FIG. 6B, a schematic diagram 650 shows another example embodiment of aspects of the described method in which a message structure is defined by an abstract representation in the form of an XPath expression.

A publishing entity 111 requests 651 to publish messages having a message structure defined by an XPath expression of the form "/body/status=success".

An intermediary system 130 may fine or define 652 a list "Topic A" with metadata of the XPath expression provided by the publishing entity 111 of "/body/status=success". There may be other lists 653 defined such as "Topic B" with metadata of the XPath expression of "/body/severity=severe". The intermediary system 130 may return 655 a name/ID of the list "Topic A" to publish those messages to.

The publishing entity 111 may then publish 654 its messages of this message structure to the identified list, "Topic A".

A subscribing entity 121 may want to pull in messages of the form "/body/status=success".

The subscribing entity 121 asks 661 the intermediary system 130 if it has any lists with items matching an XPath expression "/body/status=success".

The intermediary system 130 matches by comparing the XPath expression to lists it owns, and finds the list for "Topic A" 652 that the publishing entity 111 is publishing to.

The intermediary system 130 confirms 663 that there is a list with matching items, and it subscribes the subscribing entity 121 to that list.

The intermediary system 130 may look for topics that not only match exactly (full set) but will include a partial match. For example, a topic containing data for "/body/status= [success|failure]" will contain data matching all success and failure messages, including for example "/body/ status=success".

Further aspects and variations of aspects of the described method and system are now provided.

The publishing entity and subscribing entity need not be aware of any internal queue/topics/naming conventions etc. They just detail what type of data they are publishing and what type of data they are interested in. The rest may be implemented transparently to the publishing entities and subscribing entities by the intermediary system.

In one aspect, a subscribing entity may be returned subscriptions to multiple topics that match the provided pattern exactly or as a subset. This may be carried out transparently to the subscribing entity.

If the subscriber requests something, the intermediary system may either look through every item in a list and return it as a subscribed list only if every item matches; or just look at the first item in each list, and if that matches then subscribe to the list; or look through the whole list but stop as soon as one match is found, and subscribe to that.

In addition, the intermediary system may abstract the subscription away, i.e., after going through the above steps, it may be found that three topics match what the subscriber is asking for. At this point, a new, "virtual topic" may be created, with the abstract representation in the metadata that the subscriber has asked for, with a mapping to the three topics found. The subscribing entity will only be told about one topic matching, but under the covers, three topics are being matched, and the intermediary system is handling this translation.

In a further aspect, the intermediary system may browse list data to ascertain what proportion of the list data will match in a "partial match".

A subscribing entity may say "I'm interested in pattern X . . . ". The intermediary system may respond saying "I have a topic matching pattern X, but also have a topic matching pattern Y, which matches an intersection of the data that pattern X matches . . . "

The intermediary system may sample the data matching pattern Y to evaluate the likelihood of that data matching the subscriber's pattern, and may make a decision whether or not to subscribe the entity to that one too, if it meets a given threshold.

The subscription is (in this case) the joining of these two topics. A filter (as described below) may filter out data that does not match precisely. If at a later time the intermediary system sees that all the items of interest to this subscriber are from pattern X and not pattern Y topic, it may discard pattern Y from its subscription topics.

In a further aspect, a filter may process message data on the intermediary system or subscribing entity to filter out data from a "partial match" that does not match.

If a subscribing entity asks for Topic A, but allows partial matches, it might be interested only in years before 2000, but is subscribed to a general (Years) Topic A. At this point, the subscribing entity or the intermediary system itself can implement an additional filter to only push items from this topic that match the particular items that the subscribing entity is interested in.

For example, the subscribing entity asks for items that match "year<2000". The intermediary system knows of a topic that contains years, so subscribes the subscribing entity to this topic, with the addition of a filter on the front (for this particular subscribing entity only). Every time an item is pushed from that topic to all the subscribing entities of that topic, the filter is first invoked for this particular case, and if the item being pushed does not match "<2000", it is not passed onto this particular subscribing entity.

Alternatively, the processing for the filter may be done on the part of the subscribing entity itself, who may not wish to trust everything it receives from the intermediary system.

In a further aspect, if a topic is determined to not reach a defined threshold of a partial match (i.e., <50% of data matches) the subscription may be removed.

Suppose a subscribing entity is subscribed to Topic A. At a later point in time, after more and more things are pushed onto that topic from publishing entities, it is found that only 20% of the items in this topic actually interest what the subscribing entity was actually intending to want to know about. The subscribing entity may optionally add a filter at their side of the conversation, to do a final check before carrying on with its processing. However, to save the subscribing entity some time, the intermediary system may simply remove their subscription from this topic, since it is become less interesting to them (say, below a defined threshold of 50% . . . ).

Alternatively, the intermediary system may have logic to split a topic appropriately based on statistical analysis of pattern matches.

The intermediary system may know that a subscriber is only interested in some subset of the items, and instead of just unsubscribing them from this topic, it could split the topic into two, and subscribe the subscriber to the half that it is actually interested in. Again, this may all be carried out transparently to the subscriber.

In a further aspect, on publish, "partial matching" may be identified and overlapping patterns with common data may be merged to use the same topic.

Suppose publishing entity A is publishing to Topic A, and publishing entity B to Topic B:

Topic A—1991 1992 1993

Topic B—2012 2045 1934 1249

There are two separate topics for what is likely to be the same sets of data of the form of 4-digit years. It may have been that publishing entity A only asked for [1-9]{4}, which matched Topic A but not Topic B (or Topic A was created for it). However, publishing entity A does partially match Topic B too (just not the years with a zero digit). In this case, the intermediary system may have a periodic job run where it looks for 4-digit years, and if it finds topics that contain only these years, it may merge them together to save storage space, while telling publishing entities A and B to instead publish to the new merged Topic C.

As described herein, according to one aspect of the present invention, there is provided a method for publish/ subscribe messaging using a message structure carried out at a messaging intermediary system, comprising: maintaining a plurality of lists to which publishing entities can publish messages and to which subscribing entities can subscribe to messages; providing a list for messages conforming, at least partly, to a common message structure; matching a request from a publishing entity or a subscribing entity to one or more provided lists by comparing a message having a message structure or an abstract representation of one or more messages to the provided lists; and sharing messages conforming, at least partly, to the common message structure via the list.

The method may include defining a list by metadata of an abstract representation of the common message structure. The method may further include identifying a list with an identifier which is used to reference a list to a publishing entity or a subscribing entity.

The matching may compare a message having a message structure or an abstract representation of one or more messages with metadata of an abstract representation of the common message structure of the provided lists.

The matching may compare a message having a message structure or an abstract representation of one or more messages with message instances in each of the provided lists.

The method may further include: receiving a request from a publishing entity for publishing of messages having a message structure; determining if one or more lists for the message structure exist by matching to message structures of provided lists; and providing the publishing entity with list identifiers for the one or more lists to which the message structure conforms and to which messages having the message structure can be published. The method may include creating a new list for a message structure that does not match message structures of provided lists.

The method may include receiving a request from a subscribing entity to subscribe to messages having a message structure; determining if one or more lists for the message structure exist by matching to message structures of provided lists; and providing the subscribing entity with list identifiers for the one or more lists from which messages having the message structure are to be subscribed.

Matching a request from a publishing entity or a subscribing entity to one or more provided lists by comparing a message having a message structure or an abstract representation of one or more messages to the provided lists, may include matching a request with a partial match to one or more provided lists.

The method may include splitting a list appropriately based on statistical analysis of matching requests.

The method may also include merging lists on publishing with common data published to a single list.

According to another aspect of the present invention, there is provided a system for publish/subscribe messaging using message expression format including a messaging intermediary system, comprising: a list maintaining component for maintaining a plurality of lists to which publishing entities can publish messages and to which subscribing entities can subscribe to messages; a list providing component for providing a list for messages conforming, at least partly, to a common message structure; a processing component for matching a request from a publishing entity or a subscribing entity to one or more provided lists by comparing a message having a message structure or an abstract representation of one or more messages to the provided lists; and a publish/subscribe component for sharing messages conforming, at least partly, to the common message structure via the list.

The system may include a metadata component for defining a list by metadata of an abstract representation of the common message structure.

The system may further include an identifier component for providing a list with an identifier which is used to reference a list to a publishing entity or a subscribing entity.

The processing component may compare a message having a message structure or an abstract representation of one or more messages with metadata of an abstract representation of the common message structure of the provided lists.

The processing component may compare a message having a message structure or an abstract representation of one or more messages with message instances in each of the provided lists.

The system may include a publishing entity request component for receiving a request from a publishing entity for publishing of messages having a message structure, the publishing entity request component including: using the processing component for determining if one or more lists for the message structure exist by matching to message structures of provided lists; and the publishing entity request component providing the publishing entity with list identifiers for the one or more lists to which the message structure conforms and to which messages having the message structure can be published.

The system may include a creating component for creating a new list for a message structure that does not match message structures of provided lists.

The system may include a subscribing entity request component for receiving a request from a subscribing entity to subscribe to messages having a message structure, the subscribing entity request component including: using the processing component for determining if one or more lists for the message structure exist by matching to message structures of provided lists; and the subscribing entity request component providing the subscribing entity with list identifiers for the one or more lists from which messages having the message structure are to be subscribed.

The processing component for matching a request from a publishing entity or a subscribing entity to one or more provided lists by comparing a message having a message structure or an abstract representation of one or more messages to the provided lists may include matching a request with a partial match of one or more provided lists.

The system may include a splitting component for splitting a list appropriately based on statistical analysis of matching requests.

The system may include a merging component for merging lists on publishing with common data published to a single list.

According to a further aspect of the present invention, there is provided a computer program stored on a computer readable medium and loadable into the internal memory of a digital computer, comprising software code portions, when said program is run on a computer, for performing the method of an aspect of the present invention.

According to a yet further aspect of the present invention, there is provided a method substantially as described with reference to the figures.

According to an even further aspect of the present invention, there is provided a system substantially as described with reference to the figures.

The described aspects of the invention enable the sharing of data based on the structure of the data being shared.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A method of publish/subscribe messaging, comprising:
maintaining, by one or more processors executing a messaging middleware system, a plurality of lists to which publishing entities can publish messages and to which subscribing entities can subscribe to the messages, wherein the publishing entities and the subscribing entities comprise applications, wherein the messages comprise inter-application communications, and wherein the middleware messaging system manages the inter-application communications;
providing, by the one or more processors, one or more lists of the plurality of lists, wherein each list of the one or more provided lists is utilized to share messages conforming, at least in part, to a common message structure, wherein a message structure of a given message defines internal contents of textual material comprising the given message, the internal contents consisting of a pattern;

obtaining, by the one or more processors, a request from one of a publishing entity or a subscribing entity to one or more provided lists of the plurality of lists, wherein the request specifies a given message structure, and wherein the request comprises a message comprising the given message structure;

determining, by the one or more processors, if the request matches the one or more provided lists by comparing the given message structure to the one or more provided lists;

based on matching the request to a given list of the one or more provided lists, automatically sharing, by the one or more processors, the message comprising the given message structure, based on the matching establishing that the given message structure conforms, at least in part, to the common message structure, via the given list;

based on not matching the request to the one or more provided lists, automatically sharing, by the one or more processors, the message, via the new list, the automatically sharing via a new list comprising:
  automatically generating, by the one or more processors, the new list based on the given message structure;
  automatically sharing, by the one or more processors, the message, via the new list, wherein the given message structure of the message defines internal contents of textual material comprising the message, the internal contents defining the message consisting of: a pattern; and
  updating, by the one or more processors, the plurality of lists to which publishing entities can publish messages and to which subscribing entities can subscribe to the messages to include the new list;

determining that the a list selected from the group consisting of the given list and the new list and one or more provided lists and one or more of the plurality of lists comprise overlapping patterns with common data;

based on the determining, merging, on publishing, the selected list and the one or more provided lists into a single list; and based on the merging, automatically notifying the publishing entity to publish to the single list instead of the selected list.

2. The method as claimed in claim 1, further including:
defining the given list by metadata of an abstract representation of the common message structure.

3. The method as claimed in claim 1, further including:
identifying the given list with an identifier which is used to reference the given list to a publishing entity or a subscribing entity.

4. The method as claimed in claim 1, wherein the matching compares the message having the message structure with metadata of an abstract representation of the common message structure of each list of the one or more provided lists.

5. The method as claimed in claim 1, wherein the matching compares the message having the given message structure with message instances in each of the one or more provided lists.

6. The method as claimed in claim 1, further comprising:
receiving a request from the publishing entity for publishing of messages having the message structure;

determining whether one or more lists for the message structure exist by matching to message structures of the one or more provided lists; and providing the publishing entity with list identifiers for the one or more lists to which the given message structure conforms and to which messages having the given message structure can be published.

7. The method as claimed in claim 1, further including:
receiving a request from the subscribing entity to subscribe to messages having the given message structure;

determining whether one or more lists for the message structure exist by matching the messages to message structures of provided lists; and providing the subscribing entity with list identifiers for the one or more lists from which the messages having the given message structure are to be subscribed.

8. The method as claimed in claim 1, wherein the matching comprises matching a request with a partial match to one or more provided lists.

9. The method as claimed in claim 1, including splitting a list appropriately based on statistical analysis of matching requests.

10. A computer system for publish/subscribe messaging, comprising:
a memory; and
one or more processors in communication with the memory, wherein the computer system is configured to perform a method, said method comprising:
  maintaining, by the one or more processors executing a messaging middleware system, a plurality of lists to which publishing entities can publish messages and to which subscribing entities can subscribe to the messages, wherein the publishing entities and the subscribing entities comprise applications, wherein the messages comprise inter-application communications, and wherein the middleware messaging system manages the inter-application communications;
  providing, by the one or more processors, one or more lists of the plurality of lists, wherein each list of the one or more provided lists is utilized to share messages conforming, at least in part, to a common message structure, wherein a message structure of a given message defines internal contents of textual material comprising the given message, the internal contents consisting of: a pattern;
  obtaining, by the one or more processors, a request from one of a publishing entity or a subscribing entity to one or more provided lists of the plurality of lists, wherein the request specifies a given message structure, and wherein the request comprises a message comprising the given message structure;
  determining, by the one or more processors, if the request matches the one or more provided lists by comparing the given message structure to the one or more provided lists;
  based on matching the request to a given list of the one or more provided lists, automatically sharing, by the one or more processors, the message comprising the given message structure, based on the matching establishing that the given message structure conforms, at least in part, to the common message structure, via the given list;
  based on not matching the request to the one or more provided lists, automatically sharing, by the one or more processors, the message, via the new list, the automatically sharing via a new list comprising:

automatically generating, by the one or more processors, the new list based on the given message structure;

automatically sharing, by the one or more processors, the message, via the new list, wherein the given message structure of the message defines internal contents of textual material comprising the message, the internal contents defining the message consisting of: a pattern; and updating, by the one or more processors, the plurality of lists to which publishing entities can publish messages and to which subscribing entities can subscribe to the messages to include the new list;

determining that the a list selected from the group consisting of the given list and the new list and one or more provided lists and one or more of the plurality of lists comprise overlapping patterns with common data;

based on the determining, merging, on publishing, the selected list and the one or more provided lists into a single list; and based on the merging, automatically notifying the publishing entity to publish to the single list instead of the selected list.

11. The computer system as claimed in claim 10, wherein the method further includes:

defining the given list by metadata of an abstract representation of the common message structure.

12. The computer system as claimed in claim 10, wherein the method further includes:

receiving a request from the publishing entity for publishing of messages having the given message structure;

determining whether one or more lists for the message structure exist by matching to message structures of the one or more provided lists; and providing the publishing entity with list identifiers for the one or more lists to which the given message structure conforms and to which messages having the given message structure can be published.

13. The computer system as claimed in claim 10, wherein the method further includes:

receiving a request from the subscribing entity to subscribe to messages having the given message structure;

determining whether one or more lists for the message structure exist by matching the messages to message structures of provided lists; and providing the subscribing entity with list identifiers for the one or more lists from which the messages having the given message structure are to be subscribed.

14. A computer program product for publish/subscribe messaging, comprising:

a computer readable storage medium readable by a processing circuit and storing instructions for execution by the processing circuit for performing a method comprising:

maintaining, by one or more processors executing a messaging middleware system, a plurality of lists to which publishing entities can publish messages and to which subscribing entities can subscribe to the messages, wherein the publishing entities and the subscribing entities comprise applications, wherein the messages comprise inter-application communications, and wherein the middleware messaging system manages the inter-application communications;

providing, by the one or more processors, one or more lists of the plurality of lists, wherein each list of the one or more provided lists is utilized to share messages conforming, at least in part, to a common message structure, wherein a message structure of a given message defines internal contents of textual material comprising the given message, the internal contents consisting of: a pattern;

obtaining, by the one or more processors, a request from one of a publishing entity or a subscribing entity to one or more provided lists of the plurality of lists, wherein the request specifies a given message structure, and wherein the request comprises a message comprising the given message structure;

determining, by the one or more processors, if the request matches the one or more provided lists by comparing the given message structure to the one or more provided lists;

based on matching the request to a given list of the one or more provided lists, automatically sharing, by the one or more processors, the message comprising the given message structure, based on the matching establishing that the given message structure conforms, at least in part, to the common message structure, via the given list;

based on not matching the request to the one or more provided lists, automatically sharing, by the one or more processors, the message, via the new list, the automatically sharing via a new list comprising:

automatically generating, by the one or more processors, the new list based on the given message structure;

automatically sharing, by the one or more processors, the message, via the new list, wherein the given message structure of the message defines internal contents of textual material comprising the message, the internal contents defining the message consisting of: a pattern; and updating, by the one or more processors, the plurality of lists to which publishing entities can publish messages and to which subscribing entities can subscribe to the messages to include the new list;

determining that the a list selected from the group consisting of the given list and the new list and one or more provided lists and one or more of the plurality of lists comprise overlapping patterns with common data;

based on the determining, merging, on publishing, the selected list and the one or more provided lists into a single list; and based on the merging, automatically notifying the publishing entity to publish to the single list instead of the selected list.

15. The computer program product as claimed in claim 14, wherein the method further includes:

defining the given list by metadata of an abstract representation of the common message structure.

16. The computer program product as claimed in claim 14, wherein the method further includes:

identifying the given list with an identifier which is used to reference the given list to a publishing entity or a subscribing entity.

17. The computer program product as claimed in claim 14, wherein the method further includes:

receiving a request from the publishing entity for publishing of messages having the message structure;

determining whether one or more lists for the message structure exist by matching to message structures of the one or more provided lists; and providing the publishing entity with list identifiers for the one or more lists to which the given message structure conforms and to which messages having the given message structure can be published.

18. The computer program product as claimed in claim 14, wherein the method further includes:
receiving a request from the subscribing entity to subscribe to messages having the given message structure;
determining whether one or more lists for the message structure exist by matching the messages to message structures of provided lists; and
providing the subscribing entity with list identifiers for the one or more lists from which the messages having the given message structure are to be subscribed.

19. The method as claimed in claim 1, wherein maintaining the plurality of lists comprises adding the new list to the one or more provided lists, the method further comprising:
determining, by the one or more processors, if a new request from one of the publishing entity or the subscribing entity to the one or more provided lists matches the one or more provided lists by comparing one of a message having a message structure to the one or more provided lists; and
matching, by the one or more processors, a new request from the one of the publishing entity or the subscribing entity to the one or more provided lists by comparing one of a new message having a new message structure to the one or more provided lists; and
sharing, by the one or more processors, messages conforming, at least in part, to the message structure, via the new list.

* * * * *